US008545009B2

(12) United States Patent
Ohara

(10) Patent No.: US 8,545,009 B2
(45) Date of Patent: Oct. 1, 2013

(54) APPARATUS CAPABLE OF HANDLING CODE, METHOD FOR CONTROLLING THE SAME, AND PROGRAM THEREFOR

(75) Inventor: Eiji Ohara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 118 days.

(21) Appl. No.: 12/987,800

(22) Filed: Jan. 10, 2011

(65) Prior Publication Data

US 2011/0169904 A1    Jul. 14, 2011

(30) Foreign Application Priority Data

Jan. 12, 2010   (JP) ................................. 2010-003626

(51) Int. Cl.
*B41J 2/01* (2006.01)
(52) U.S. Cl.
USPC ......................................... 347/107; 235/494
(58) Field of Classification Search
USPC ................ 347/107; 235/494, 375; 358/3.28, 358/468; 283/62, 67; 399/82; 400/76, 279
IPC .......................................................... B41J 2/01
See application file for complete search history.

(56) References Cited

U.S. PATENT DOCUMENTS

| 2005/0224572 | A1* | 10/2005 | Kelley et al. ................... 235/375 |
| 2007/0002411 | A1  | 1/2007  | Sakai |
| 2007/0158425 | A1* | 7/2007  | Matsuura ................. 235/462.13 |
| 2007/0257977 | A1* | 11/2007 | Wicker et al. ................. 347/107 |
| 2008/0104715 | A1  | 5/2008  | Saka |
| 2009/0034787 | A1  | 2/2009  | Sato |
| 2009/0070348 | A1  | 3/2009  | Uejo |
| 2009/0122351 | A1* | 5/2009  | Tsuchitoi ..................... 358/3.28 |
| 2009/0161993 | A1* | 6/2009  | Matsunoshita ............... 382/305 |
| 2009/0244639 | A1* | 10/2009 | Itoh et al. ..................... 358/3.28 |
| 2009/0268259 | A1* | 10/2009 | Kikuchi ........................ 358/468 |
| 2009/0279110 | A1  | 11/2009 | Ito |
| 2010/0140362 | A1* | 6/2010  | Tokumaru ..................... 235/494 |

FOREIGN PATENT DOCUMENTS

| JP | 2006-259045 A | 9/2006 |
| JP | 2008-118210 A | 5/2008 |
| JP | 2009-272796 A | 11/2009 |
| JP | 2009-273025 A | 11/2009 |

* cited by examiner

*Primary Examiner* — Manish S Shah
*Assistant Examiner* — Roger W Pisha, II
(74) *Attorney, Agent, or Firm* — Canon USA Inc IP Division

(57) ABSTRACT

An apparatus includes a printing unit to print, when printing a plurality of pages to an output page, a first page and a second page respectively on both sides across a boundary line in the output page. The printing unit prints a two-dimensional code on a boundary line side in the first page. Further, the printing unit prints a two-dimensional code on a side opposite to the boundary line in the second page.

10 Claims, 7 Drawing Sheets

FIG.1
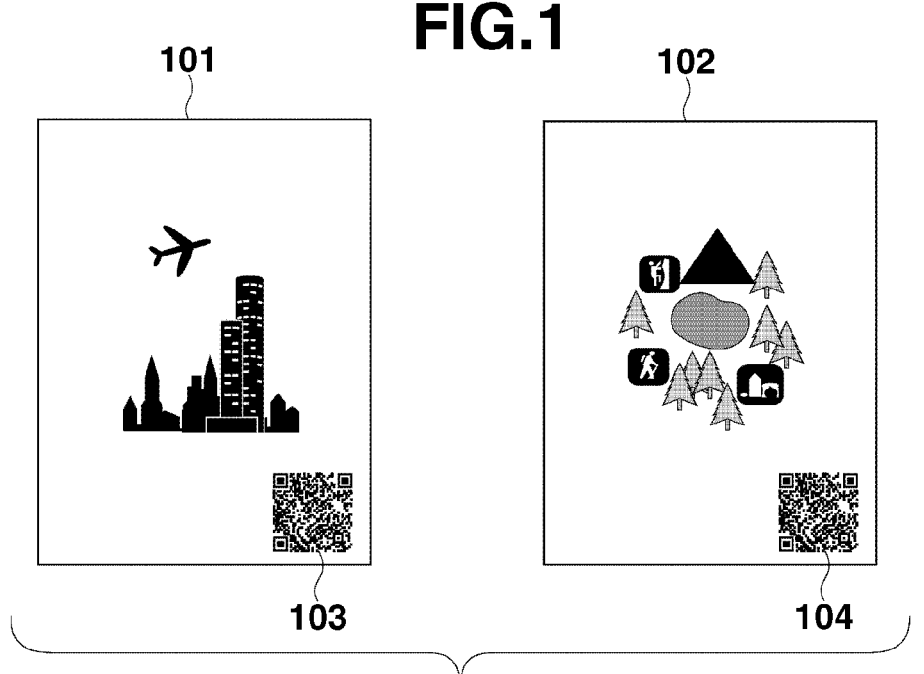
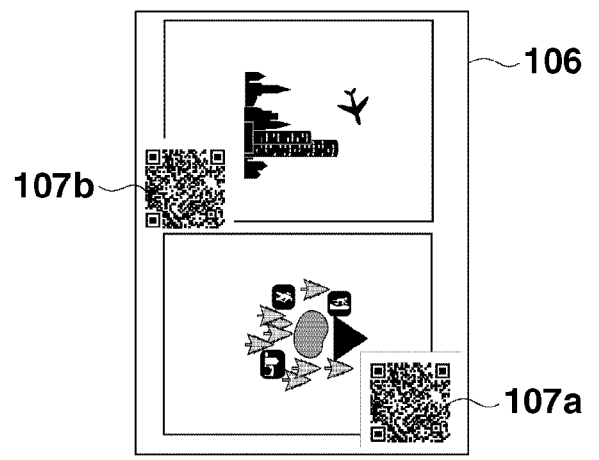

FIG.6
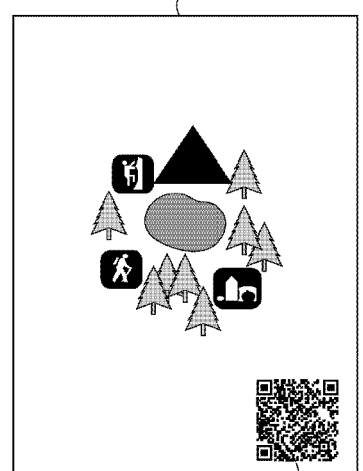
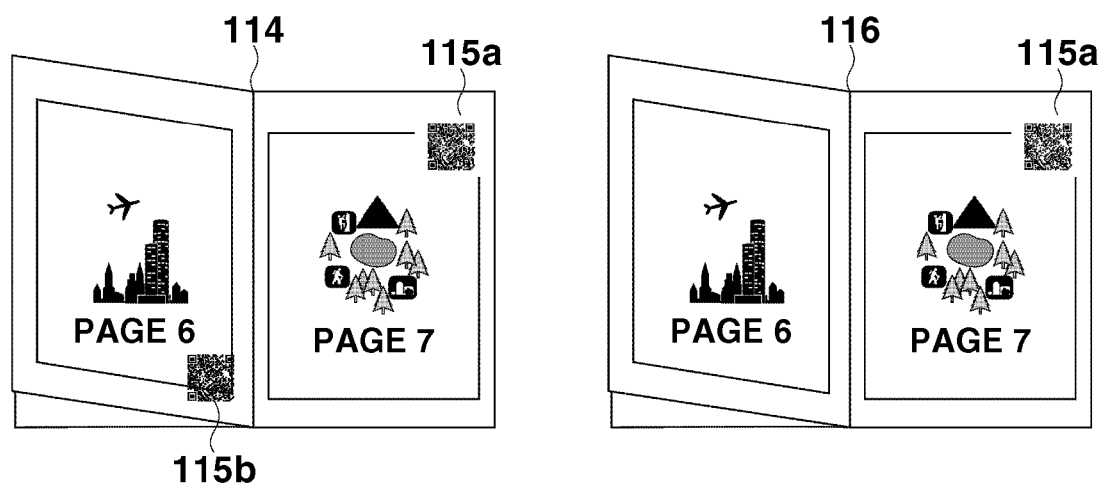

US 8,545,009 B2

APPARATUS CAPABLE OF HANDLING CODE, METHOD FOR CONTROLLING THE SAME, AND PROGRAM THEREFOR

BACKGROUND OF THE INVENTION

1. Field of the Invention

The present invention relates to an apparatus capable of handling a code, a method for controlling the apparatus, and a program therefor.

2. Description of the Related Art

Japanese Patent Application Laid-Open No. 2009-272796 discusses a technique for printing only one two-dimensional code at a position of any one of the four corners of a print sheet. Japanese Patent Application Laid-Open No. 2009-272796 also discusses another technique for detecting a two-dimensional code from the positions of the four corners of such a print product, and performing control based on the two-dimensional code. When a plurality of two-dimensional codes is printed at the positions of the four corners of one print sheet in such an environment, it becomes difficult to determine which one of two-dimensional codes should be used to perform control.

SUMMARY OF THE INVENTION

In an embodiment, an apparatus includes a printing unit to print, when printing a plurality of pages to a output page, a first page and a second page respectively on both sides across a boundary line in the output page. The printing unit prints a two-dimensional code on a boundary line side in the first page. Further, the printing unit prints a two-dimensional code on a side opposite to the boundary line in the second page.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 illustrates a system according to a first exemplary embodiment.

FIG. 6 illustrates an exemplary bookbinding print-output according to the second exemplary embodiment.

DESCRIPTION OF THE EMBODIMENTS

Figure 2:
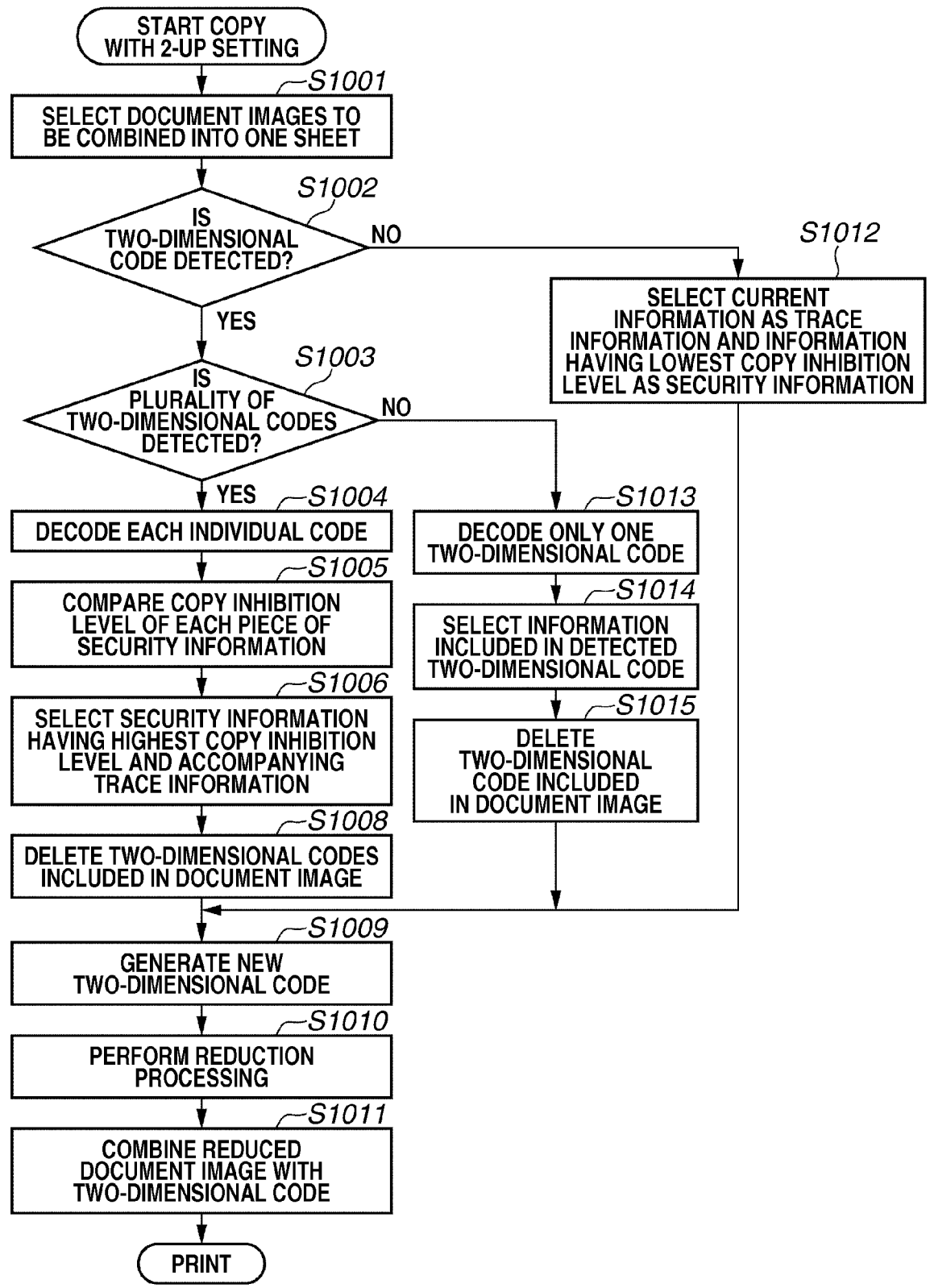
FIG. 2 is a flow chart according to the first exemplary embodiment.

Various exemplary embodiments, features, and aspects of the invention will be described in detail below with reference to the drawings.

In the present exemplary embodiment, one code is generated from two codes each of which originally was included in each of two document images. Further, the generated code is printed at two positions, i.e., in a predetermined area and a non-predetermined area in one image formed by combining two reduced document images.

The predetermined area is an area that is determined in advance for a document image, and a printed code therein can be detected as a code. On the other hand, the non-predetermined area is an area other than the predetermined area for the document image. The non-predetermined area corresponds to a predetermined area only for a reduced image by half of the original document image.

When copying only the reduced image, since a code printed in the non-predetermined area corresponds to a code printed in a predetermined area, the code can be detected as a code. When copying the entire document image, a code printed in the non-predetermined area is simply handled as an image.

Therefore, in either case of a document image or a reduced image by a half of the document image, only one of two codes printed at two positions is detected. As a result, the following two problems will be solved at the same time. One problem is that processing for determining a code becomes complicated in code-based control. The other problem is that a code is missing when copying a document image with the document sheet folded in half (at the boundary). Exemplary embodiments will be described in detail below.

FIG. 1 illustrates a system according to a first exemplary embodiment. The system according to the first exemplary embodiment includes only a multifunctional peripheral (MFP) 105 as an image forming apparatus. However, the image forming apparatus is not limited to an MFP but may be any apparatus that can form an image in memory or on paper.

A document 101 has an image and a two-dimensional code 103 printed thereon including information about the document 101. Likewise, a document 102 has an image and a two-dimensional code 104 printed thereon including information about the document 102.

A user sets a plurality of document sheets on a document positioning plate, and instructs the MFP 105 to perform copying with such a setting (hereinafter referred to as 2-UP setting) that reduces two document images, evenly combines them into one print sheet, and prints the document images on the print sheet. When the user scans the documents 101 and 102 by using the MFP 105, the MFP 105 detects and decodes the two-dimensional codes 103 and 104 included in the documents 101 and 102, respectively.

A two-dimensional code printed on a document includes the information about the security of the document, such as whether or not the document is permitted to be copied, or permitted to be copied under certain conditions such as password and login user. This information is hereinafter referred to as security information.

The security information is not limited to information about the permission to copy (unconditional permission to copy) and the inhibition to copy (unconditional inhibition to copy) but may be any piece of information about the security of the document. For example, the security information may include the information about the permission/inhibition to scan, information about the permission/inhibition to transmit to outside, and information about the permission/inhibition to store in memory in the MFP 105.

The security information includes the information necessary to trace a person who has instructed to output (generate) a print-output. This information is hereinafter referred to as trace information. A document is a print sheet to be scanned while a print-output is a print sheet having certain information printed thereon. When the print-output is to be scanned, the document also serves as the print-output and therefore there is substantially no difference between the document and the print-output.

The trace information includes, for example, the user name (User Name) of a user who has instructed the MFP 105 to output a print-output, the serial number (Serial No.) of the image forming apparatus, output time (Time) of the print-output, and the Vendor of the image forming apparatus.

Not only the user name but also information other than the above is indirectly useful for tracing a person who instructed the MFP 105 to output a print-output. Therefore, in the present and other exemplary embodiments, these pieces of information are also included in the meaning of the trace information.

In the present exemplary embodiment, a two-dimensional code includes the above-mentioned two different pieces of information: the security information and the trace information. Further, the size of a two-dimensional code that can include these two different pieces of information is defined.

Two-dimensional codes having a defined size are combined in a predetermined area. Two-dimensional codes are combined not in full size of the predetermined area but such that two-dimensional codes having the defined size fit into the predetermined areas in view of a read error, etc. For example, two-dimensional codes having the defined size are combined in an area less than 5 cm from an edge of a print sheet.

The position of the two-dimensional code is limited to a predetermined area because detecting the two-dimensional code only from a predetermined area on a document takes shorter time than detecting it from the entire document for each scan.

Figure 3:
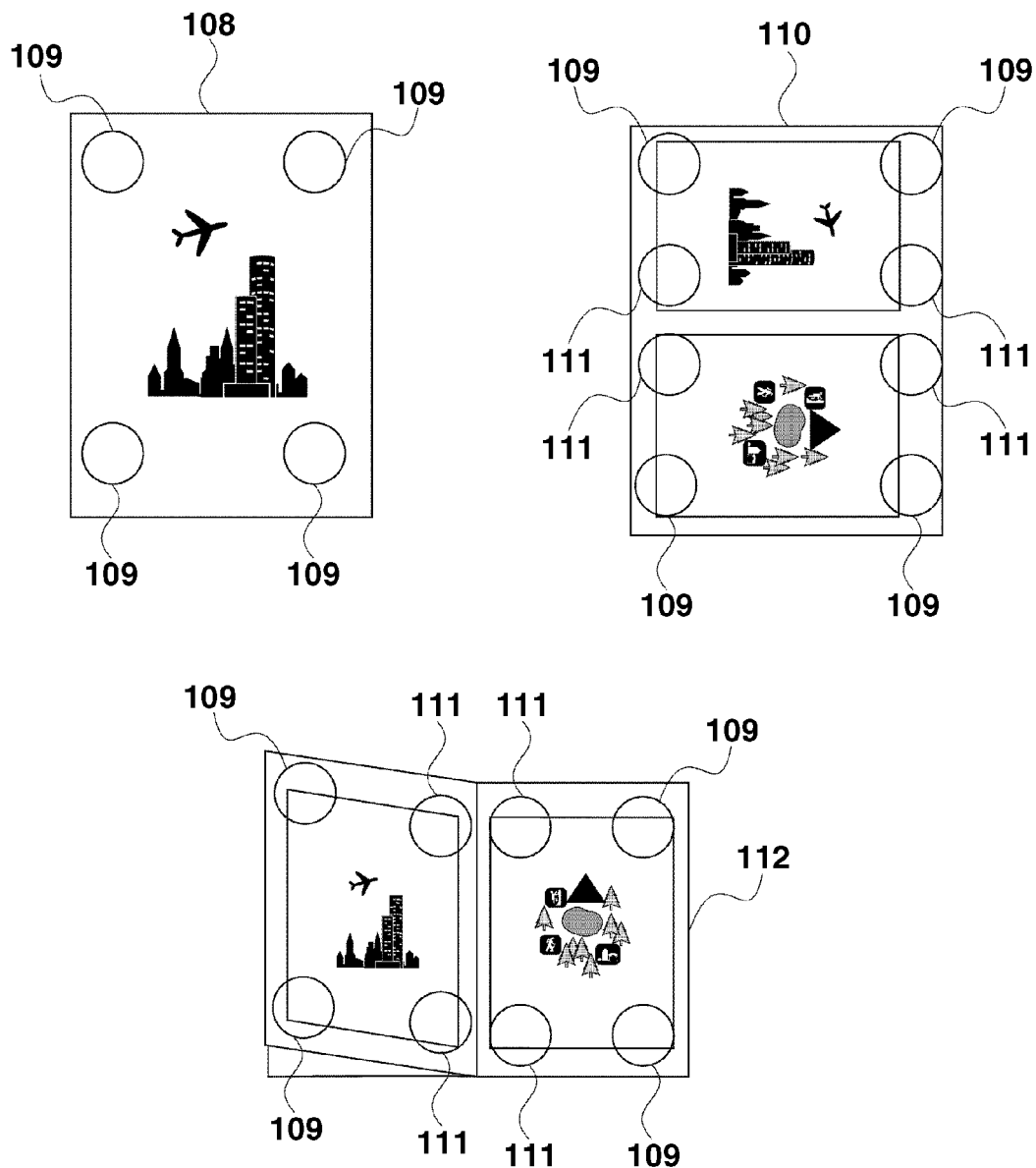
FIG. 3 illustrates a predetermined area according to the first exemplary embodiment.

FIG. 3 illustrates the predetermined area according to the present exemplary embodiment. Referring to a document image 108 in FIG. 3, the above-mentioned predetermined area is any one of circles 109 at the four corners.

Likewise, referring to a document image 110 having the 2-UP setting and a two-page spread output image (print image) 112 having the bookbinding setting described below in FIG. 3, the predetermined area is any one of the circles 109 at the four corners.

Meanwhile, referring to FIG. 3, each of the document image 110 having the 2-UP setting and the two-page spread output image 112 having the bookbinding setting includes four areas (circles 111) in addition to the predetermined areas (circles 109). Two-dimensional codes can be combined at any one of the circles 111 in addition to the above-mentioned predetermined areas (circles 109).

When copying the entire output image, two-dimensional codes combined in the circles 111 are not detected since the circles 111 are non-predetermined areas (other than the four corners). However, for example, when copying either one of two reduced images forming the output image, the two-dimensional codes combined in the circles 111 will be detected since the circles 111 correspond to the predetermined areas (four corners) of the document image.

In other words, in an embodiment, two-dimensional codes are permitted to be combined both in the predetermined areas and non-predetermined areas of the document image.

When copying the entire output image or copying each reduced image forming the output image, it is desirable to detect one two-dimensional code in the non-predetermined areas from the viewpoint of simplification of processing. Therefore, the non-predetermined areas are areas corresponding to the four corners, other than the predetermined areas, of each reduced image. Further, it is desirable to combine one two-dimensional code in either one of the predetermined areas of one reduced image and one two-dimensional code in the non-predetermined areas of the other reduced image.

In step S1002 in FIG. 2, two-dimensional codes combined in the above-mentioned predetermined areas or two-dimensional codes having the defined size corresponding to the predetermined areas are detected as a two-dimensional code.

Further as illustrated in FIG. 1, decoding the two-dimensional codes enables extracting the information included therein. Based on a setting (in the MFP 105) by a prior instruction from a user or administrator, the MFP 105 determines which piece of information is to be included in a print-output 106 and encodes the relevant information. The print-output 106 is an example of an output page.

The MFP 105 combines thus-formed two-dimensional codes 107a and 107b with reduced images based on the 2-UP setting, and outputs the print-output 106. As a result, required minimum information is selected from the information included in the two-dimensional code of the document 101 and the two-dimensional code of the document 102, and is inherited by the two-dimensional codes 107a and 107b of the print-output 106.

The present exemplary embodiment is applicable not only to a print-output having the 2-UP setting but also to a print-output having the bookbinding setting. In this case, a plurality of documents is scanned by a scanner, and the order of the scanned document images is arranged. Then, two document images are reduced and sequentially printed on both sides of print sheets to form a two-page spread output image for bookbinding (hereinafter referred to as bookbinding setting).

The arrangement of the order of document images is determined by detailed settings when the user instructs the MFP 105 to copy based on the bookbinding setting. Specifically, the order of document images scanned by the scanner is arranged depending on detailed settings such as whether the document to be scanned is a double-sided document, whether bookbinding print is opened rightward or leftward, and whether all pages are to be bound into one stack or a plurality of stacks.

When the two document images are reduced and evenly combined in the arranged order into one print sheet, and then are sequentially printed on both sides of the print sheet, a two-page spread output image 112 having the bookbinding setting in FIG. 3 can be formed.

Although, in the present exemplary embodiment, a document image scanned from the scanner of the MFP 105 is printed, the operation is not limited thereto but that an electric document generated with a personal computer (PC) may be transmitted to the MFP 105 and printed thereon. In this case, the above-mentioned processing may be executed by driver software installed in the PC, not by the MFP 105.

Although, in the present exemplary embodiment, the processing will be described centering on two-dimensional codes, persons skilled in the art will easily understand that the above-mentioned processing is also applicable to one-dimensional codes, digital watermarks, and other codes other than two-dimensional codes. Processing flow in the first exemplary embodiment will be described below with reference to the flow chart in FIG. 2.

After reception of a 2-UP setting instruction from the user on an operation screen, the MFP 105 can receive the pressing of the start button for starting copying.

When the MFP 105 performs 2-UP setting based on the 2-UP setting instruction from the user, and the user presses the start button of the MFP 105, processing of the flow chart in FIG. 2 is started.

Processing of steps S1001 to S1015 in the flow chart in FIG. 2 can be executed under total control by the central processing unit (CPU) in the MFP 105.

Instep S1001, the CPU scans L (L is an integer larger than 1) document sheets on the document positioning plate, and generates document images as electrical signals.

In the present exemplary embodiment, it is assumed that successive scanning of L document sheets is performed, for example, by using an auto document feeder (ADF). Since the MFP 105 premises the 2-UP setting, it is assumed that the L document sheets are placed on the document positioning plate.

In step S1001, the CPU selects, as a pair, two document images to be combined into one print sheet out of the L document images generated in step S1001, and the processing proceeds to step S1002. In step S1002, the CPU detects whether a two-dimensional code is included in the predetermined areas of the two document images selected in step S1001.

When no two-dimensional code is detected (NO in step S1002), the processing proceeds to step S1012. In step S1012, the CPU selects as security information the information having the lowest copy inhibition level (for example, the information about the permission to copy) out of security information that can be set by the MFP 105.

Although the CPU automatically selects the security information having the lowest copy inhibition level in step S1012, the user may select security information out of the security information that can be set by the MFP 105.

The CPU also selects the present information (including the user name of the user who has instructed the MFP 105 to output the print-output, the serial number of the image forming apparatus, the output time of the print-output, and the information about the manufacturer of the image forming apparatus) as trace information.

Limiting each of the security information and trace information to one piece of information in this way enables a two-dimensional code to fit into the defined size.

Otherwise, when a two-dimensional code is detected (YES instep S1002), the processing proceeds to step S1003. In step S1003, the CPU determines whether a plurality of two-dimensional codes is detected in step S1002.

When a plurality of two-dimensional codes is not detected (NO in step S1003), the processing proceeds to step S1013. In step S1013, the CPU decodes the detected only one two-dimensional code and extracts information included in the two-dimensional code.

In step S1014, the CPU selects the security information and trace information included in the two-dimensional code from a result of decoding in step S1013, and the processing proceeds to step S1015. Limiting each of the security information and trace information to one piece of information in this way enables a two-dimensional code to fit into the defined size.

The following processing may be performed between steps S1013 and S1014. Specifically, when the copy inhibition level of the information extracted in step S1013 is the inhibition to copy, it is also suitable to perform copy inhibiting processing (not illustrated). In step S1015, the CPU deletes the only one two-dimensional code included in the document image.

Otherwise, when a plurality of two-dimensional codes is detected (YES in step S1003), the processing proceeds to step S1004. In step S1004, the CPU decodes all of two-dimensional codes included in the document image (all of the two-dimensional codes detected in step S1002) one by one, and extracts information included in each of the two-dimensional codes. Upon completion of information extraction, the processing proceeds to step S1005.

Alternatively, the following processing may be performed between steps S1004 and S1005. Specifically, when the copy inhibition level of any one piece of information extracted in step S1004 includes the inhibition to copy, it is also desirable to perform copy inhibiting processing (not illustrated).

In step S1005, the CPU compares the security levels (the copy inhibition level in the present exemplary embodiment) in a plurality of pieces of security information out of the information acquired by decoding in step S1004, and the processing proceeds to step S1006.

It goes without saying that three different levels (permission to copy, conditional permission to copy, and inhibition to copy) have a higher copy inhibition level in this order.

Although the copy inhibition level is mentioned as an exemplary security level in the present exemplary embodiment, the security level is not limited thereto but may be any index that represents the security-related level. For example, it goes without saying that the security information includes the scan inhibition level, transmission (to outside) inhibition level, and storage (in HDD (hard disk drive) in the MFP) inhibition level.

For example, suppose that, when two document sheets having the 2-UP setting are scanned, the first page includes the information about the permission to copy and the second page includes the information about the passworded (password protected) permission to copy as a two-dimensional code.

In this case, the security information having the highest security level (the copy inhibition level in the present exemplary embodiment) selected in step S1006 is not the permission to copy with which any person is unconditionally permitted to copy but the passworded permission to copy with which only a person who knows a password is permitted to copy.

In step S1006, the CPU first selects security information having the highest security level out of the security levels compared in step S1005. Then, the CPU selects the trace information accompanying the selected security information (the trace information included in the same two-dimensional code as the security information having the highest security level).

The CPU selects trace information accompanying the security information having the highest security level because of the following reason. A person who once outputs a print-output having a high copy inhibition level must be responsible for the management of the print-output. Even after an image in the print-output is reduced by the 2-UP setting, the person who outputs the print-output can never be free from the responsibility.

Therefore, when performing 2-UP copying (copying with the 2-UP setting), the CPU selects the trace information for tracing a person who outputs a print-output of security information having a higher copy inhibition level.

For example, suppose a document sheet having the permission to copy generated by an MFP 105 based on an instruction from a person A on date 20xx/yy/zz (20xx: year, yy: month, and zz: day), and a document sheet having the passworded permission to copy generated by another MFP 105 based on an instruction from a person B on date 20aa/bb/cc (20aa: year, bb: month, and cc: day). Also suppose that a person C issues an instruction to copy the two document sheets with the 2-UP setting.

The first document sheet having the permission to copy includes the security information representing the permission to copy as a two-dimensional code. The second document sheet having the passworded permission to copy includes the security information representing the permission to copy only when a password is entered, as a two-dimensional code.

In this case, the security information determined to have the highest security level (copy inhibition level) instep S1006 is the passworded permission to copy included in the second document sheet. Therefore, the security information representing the passworded permission to copy and the trace information representing the date 20aa/bb/cc, the person B, and the MFP 1052 will be added to a print-output of the person C as a two-dimensional code.

In the case of the same security level as a result of comparison in step S1005, the CPU selects the same security level as the one included in the document as the security level to be added when outputting a print-output.

For example, suppose a document sheet having the permission to copy generated by an MFP 105 based on an instruction from a person D on date 20uu/vv/ww (20uu: year, vv: month, and ww: day), and a document sheet having the permission to copy generated by another MFP 105 based on an instruction from a person E on date 20dd/ee/ff (20dd: year, ee: month, and ff: day). Also suppose that a person F issues an instruction to copy the two document sheets with the 2-UP setting.

The first document sheet includes the security information representing the permission to copy as a two-dimensional code. Similarly, the second document sheet includes the security information representing the permission to copy as a two-dimensional code.

In this case, the security information determined to have the highest security level instep S1006 is the permission to copy included in the first and second document sheets.

The trace information selected in this case is the earliest information out of the trace information of the first and second sheets. The CPU selects the earliest information because of the following reason.

On an assumption that a person who outputs a print-output having a high security level must be responsible for the management of the print-output, the trace information is inherited to identify a person who printed the print-output having a high security level.

However, in the case of the same security level, identifying a person who printed earlier a print product having a high security level enables easily identifying an origin of information leakage as well as a sources of information used to generate a paper medium.

Therefore, the security information representing the permission to copy and the trace information representing the date 20dd/ee/ff, the person E, and the MFP 1062 will be added to a print-output of the person F as a two-dimensional code.

Also suppose a document sheet having the passworded permission to copy generated by an MFP 105 based on an instruction from a person G on date 20rr/ss/tt (20rr: year, ss: month, and tt: day), and a document sheet having the passworded permission to copy generated by another MFP 105 based on an instruction from a person H on date 20gg/hh/ii (20gg: year, hh: month, and ii: day). Also suppose that a person I issues an instruction to copy the two document sheets with the 2-UP setting.

The first document sheet includes the security information representing the passworded permission to copy as a two-dimensional code. Similarly, the second document sheet includes the security information representing the passworded permission to copy as a two-dimensional code. Also suppose that the person F issues an instruction to copy the two document sheets with the 2-UP setting.

The first document sheet includes the security information representing the passworded permission to copy as a two-dimensional code. Similarly, the second document sheet includes the security information representing the passworded permission to copy as a two-dimensional code.

In this case, the security information determined to have the highest security level instep S1006 is the passworded permission to copy included in the first and second document sheets.

In this case, the password accompanying the earliest trace information out of the trace information of the first and second document sheets is inherited by the print-output. This inheritance is based on an assumption that the above-mentioned earliest information is the most important.

Also in this case, the selected trace information is the earliest information for the same reason.

Therefore, the security information representing the passworded permission to copy and the trace information representing the date 20gg/hh/ii, the person H, and the MFP 1072 will be added to a print-output of the person I as a two-dimensional code.

In step S1008, the CPU paints white the areas having a two-dimensional code included in the document image to delete all of two-dimensional codes. The CPU applies this processing to all of the document images including a two-dimensional code.

In the present exemplary embodiment, painting white the areas having a two-dimensional code means setting the pixel value of each pixel in the areas to zero (white).

Deleting two-dimensional codes in a document in this way enables printing on a print-output a two-dimensional code having only necessary information, thus shortening the time for detecting and decoding a two-dimensional code.

When the CPU has deleted two-dimensional codes of the document image, the processing proceeds to step S1009. In step S1009, the CPU generates a new two-dimensional code based on the information selected in steps S1006, S1012, and S1014.

In this case, the CPU encodes information to generate a two-dimensional code having the same size as the two-dimensional code having the defined size added to the scanned documents 101 and 102.

A two-dimensional code having the same size as the two-dimensional code added to the scanned documents 101 and 102 can be generated since one piece of security information and one piece of trace information are selected in step S1006.

Another reason is that one piece of present security information and one piece of trace information are selected in step S1012. Still another reason is that one piece of security information and one piece of trace information included in only one two-dimensional code are selected in step S1014.

As mentioned above, in the present exemplary embodiment, when one piece of security information and one piece of trace information are selected, a two-dimensional code including these pieces of information fits into the above-mentioned defined size.

It goes without saying that, when there is less quantity of information (when there is only either the security information or the trace information), the two-dimensional code including the information fits into the above-mentioned defined size.

However, in the present exemplary embodiment, one piece of trace information means not the user name (User Name) or serial number (Serial No.) alone but a set of the user name (User Name), serial number (Serial No.) of the image forming apparatus, the output time (Time) of a print-output, and the manufacturer (Vendor) of the image forming apparatus.

In step S1010, the CPU reduces the two document images based on the 2-UP setting, and assigns the reduced images to the area in one image, thus obtaining a new document image. After assignment, the processing proceeds to step S1011.

In step S1011, the CPU combines the one new document image obtained in step S1010 with the two-dimensional code generated in step S1009. In this case, when one document image is divided into two, the CPU will lay out a two-dimensional code in a predetermined area in the area in one image and in a non-predetermined area in the area in the other image.

Areas corresponding to two out of the four corners are predetermined areas. Which of the two corners a two-dimensional code is to be laid out at depends on an administrator setting in the image forming apparatus. Likewise, areas corresponding to two out of the four corners are non-predetermined areas. Which of the two corners a two-dimensional code is to be laid out at depends on the administrator setting in the image forming apparatus.

Figure 4:
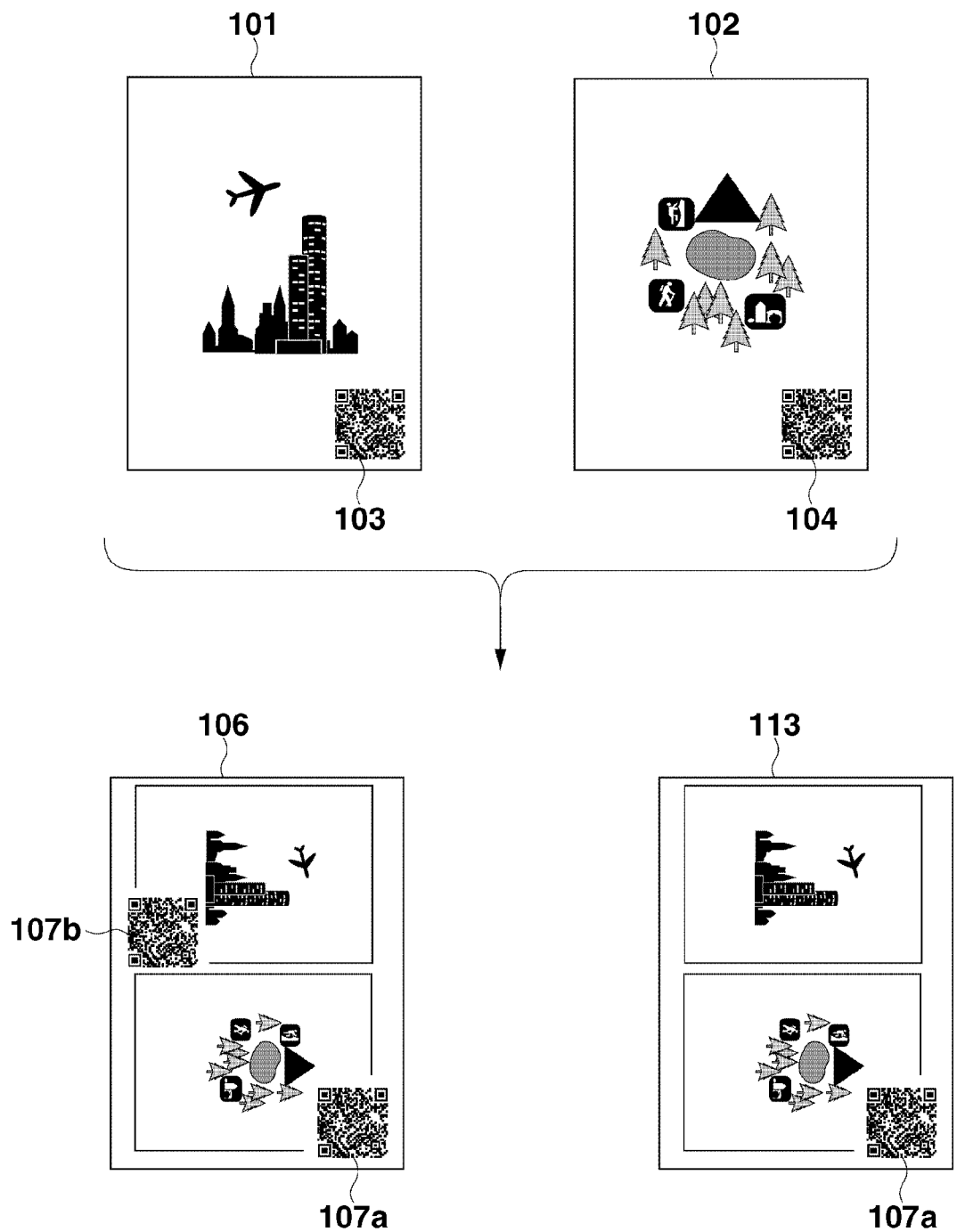
FIG. 4 illustrates an exemplary print-output according to the first exemplary embodiment.

For example, when the administrator sets the area to the bottom right position on the left page and the top right position on the right page, the result is the print-output 106 in FIG. 4. The points described in this paragraph also apply to a second exemplary embodiment.

As another method, when a two-dimensional code is detected in step S1002 or S1003, it is also possible to store the detected position in the image forming apparatus and lay out a two-dimensional code based on the detected position.

For example, when a two-dimensional code of the document image to be printed as the left page is detected from the top right position, and a two-dimensional code of the document image to be printed as the right page is detected from the top right position, two-dimensional codes may be laid out at the detected corner positions (the positions corresponding to the top right corner on both pages).

However, in this case, when each position is different from the position indicated in step S1011, the administrator setting will be followed.

For example, when a two-dimensional code of the document image to be printed as the left page is detected from the top left position, and a two-dimensional code of the document image to be printed as the right page is detected from the top right position, printing these two-dimensional codes at their original positions results in the two two-dimensional codes existing in the predetermined areas.

To avoid this, a two-dimensional code will be laid out at the bottom right position on the left page and at the top right position on the right page according to the administrator setting. Specifically, the position of the two-dimensional code on the left page will be changed according to the administrator setting. Likewise, when two-dimensional codes of the document images to be printed as the right and left pages are detected from a non-predetermined area, the position of the two-dimensional code of one reduced image will be changed to the position of a predetermined area.

Then, the combined image is handled as output image data. Two-dimensional codes are included in the output image in this way. Then, the MFP 105 prints the output image data as a print-output only when copying is permitted.

The CPU determines whether copying is permitted based on the information having the highest security level out of the security information included in the two document images selected in step S1001.

For example, when the information having the highest security level is the information about the passworded permission to copy, the CPU prompts the user to enter a password, and determines whether copying is permitted depending on whether the entered password is correct. When the password is correct, the CPU permits copying. Otherwise, the CPU inhibits copying.

Processing of step S1011 will be described below with reference to FIG. 4.

FIG. 4 illustrates an example print-output according to the first exemplary embodiment to complement descriptions of the processing of step S1011. The print-output 106 is formed by combining the two reduced document images 101 and 102 with the two-dimensional codes 107a and 107b generated in step S1009. The two-dimensional codes 107a and 107b are identical codes.

The two-dimensional code 107a is combined in any one of circles 109 in the predetermined areas illustrated in FIG. 3, and the two-dimensional code 107b is combined in any one of circles 111 in a reduced image different from the reduced image with which the two-dimensional code 107a is combined.

Therefore, there are eight combinations of areas (four corners) for actually combining two two-dimensional codes in the print-output 106, since there are four combinations of predetermined areas, each having two combinations of non-predetermined areas.

When copying the print-output 106 by using the MFP 105, the CPU normally detects the two-dimensional code 107a combined in a predetermined area, and does not detect the two-dimensional code 107b combined in a non-predetermined area.

However, when the user instructs the MFP 105 to make setting for separately copying the reduced images of the print-output 106 as different images (hereinafter referred to as continuous-copy-of-pages setting), the CPU detects the two-dimensional codes 107a and 107b combined with the reduced images when copying each reduced image since each of these codes corresponds to a predetermined area.

Not only with the continuous-copy-of-pages setting but when copying an image with the print-output 106 folded in half, for example, when the MFP 105 copies only one reduced image, the CPU determines that the two-dimensional code 107b is combined in a predetermined area, and therefore detects the two-dimensional code 107b.

Unlike the print-output 106, a print-output 113 is combined only with the two-dimensional code 107a and not combined with the two-dimensional code 107b. In view of the purpose of combining two-dimensional codes, the above-mentioned processing is based on an assumption that combining the two-dimensional code 107b is necessary, for example, only when it includes the information about the inhibition to copy.

Therefore, when the two-dimensional code 107b includes no information about the inhibition to copy, the operation of the MFP 105 is not limited at all and therefore the two-dimensional code 107b may be omitted. This case, however, has an advantage that areas of the document images can be effectively used.

In this case, there are four combinations of predetermined areas for actually combining a two-dimensional code in the print-output 113.

Further, even when the two-dimensional codes 107a and 107b include the information about the inhibition to copy, the two-dimensional code of either the document image 101 or 102 may include the information about the inhibition to copy. In this case, the two-dimensional code 107b can be omitted.

In view of the purpose of combining two-dimensional codes, the above-mentioned processing is based on an assumption that it is sufficient to combine the two-dimensional code 107a in a predetermined area in one reduced image including the information about the inhibition to copy, and the other reduced image includes the information about the permission to copy and therefore the operation of the MFP 105 need not be limited at all.

In this case, in the one reduced image, there are two combinations of predetermined areas for actually combining a two-dimensional code in the print-output 113.

Although the first exemplary embodiment has specifically been described based on a case where the security information includes three different security levels (the permission to copy, the conditional permission to copy, and the inhibition to copy), additional copy inhibition levels may be set in the future. Accordingly, it is necessary for the administrator and user to set the order of the copy inhibition levels in the MFP 105 in advance.

In the first exemplary embodiment, the information about the inhibition to copy included in a two-dimensional code is not simply limited to the inhibition to copy. The two-dimensional code may include the conditional permission to copy.

In the first exemplary embodiment, in step S1011, the CPU generates the print images 101 and 102 (upper and lower halves, respectively, of the print-output 106 in FIG. 1) so that both print images include a two-dimensional code having a high security level out of a plurality of two-dimensional codes. However, other forms are also possible.

For example, referring to FIG. 1, suppose a case where the document image 101 includes the two-dimensional code 103 having the permission to copy and the document image 102 includes the two-dimensional code 104 having the conditional permission to copy. In this case, print images may be generated so that the two-dimensional code 107*b* has the permission to copy, and the two-dimensional code 107*a* has the permission to copy.

Specifically, the two-dimensional codes 104 and 107*a* having the highest security level will be combined at either of two corners of the area for the document in which the two-dimensional codes existed (the bottom half area of the print-output 106), out of the four corners in the print image.

Other two-dimensional codes 103 and 107*b* will be combined at any one of the four corners (the bottom left and bottom right positions in the top half area of the print-output 106) of the area in the document (the top half area of the print-output 106) in which the two-dimensional codes have existed, not the four corners in the print image.

Combining the two-dimensional codes in this way enables processing according to the two-dimensional code having the highest security level when the entire print image 106 is scanned. On the other hand, when the folded print image 106 is scanned, processing will be performed according to the two-dimensional code originally having existed in areas pressed onto the document positioning plate.

To achieve the above processing, it is necessary to perform not only code generation with the selected information but also the following processing of step S1009 in FIG. 2. Specifically, it is necessary to perform processing for generating remaining two-dimensional codes having a low security level (for example, by decoding other two-dimensional codes detected in step S1002 and encoding relevant information, or cutting out other two-dimensional codes detected in step S1002).

In step S1011, the two-dimensional codes generated from selected information will be combined at either of two corners of the area in the document in which the two-dimensional codes exist, out of the four corners in the print image. Also in step S1011, other two-dimensional codes will be combined at any one of the four corners of the area for the document in which the two-dimensional codes have existed, not the four corners in the print image.

Since a system according to the second exemplary embodiment is identical to the system according to the first exemplary embodiment, descriptions will be omitted. Processing flow in the second exemplary embodiment will be described below with reference to the flowchart in FIG. 5. When the MFP 105 makes bookbinding setting based on a bookbinding setting instruction from the user and then the user presses the start button of the MFP 105, processing of the flow chart in FIG. 5 is started.

Figure 5:
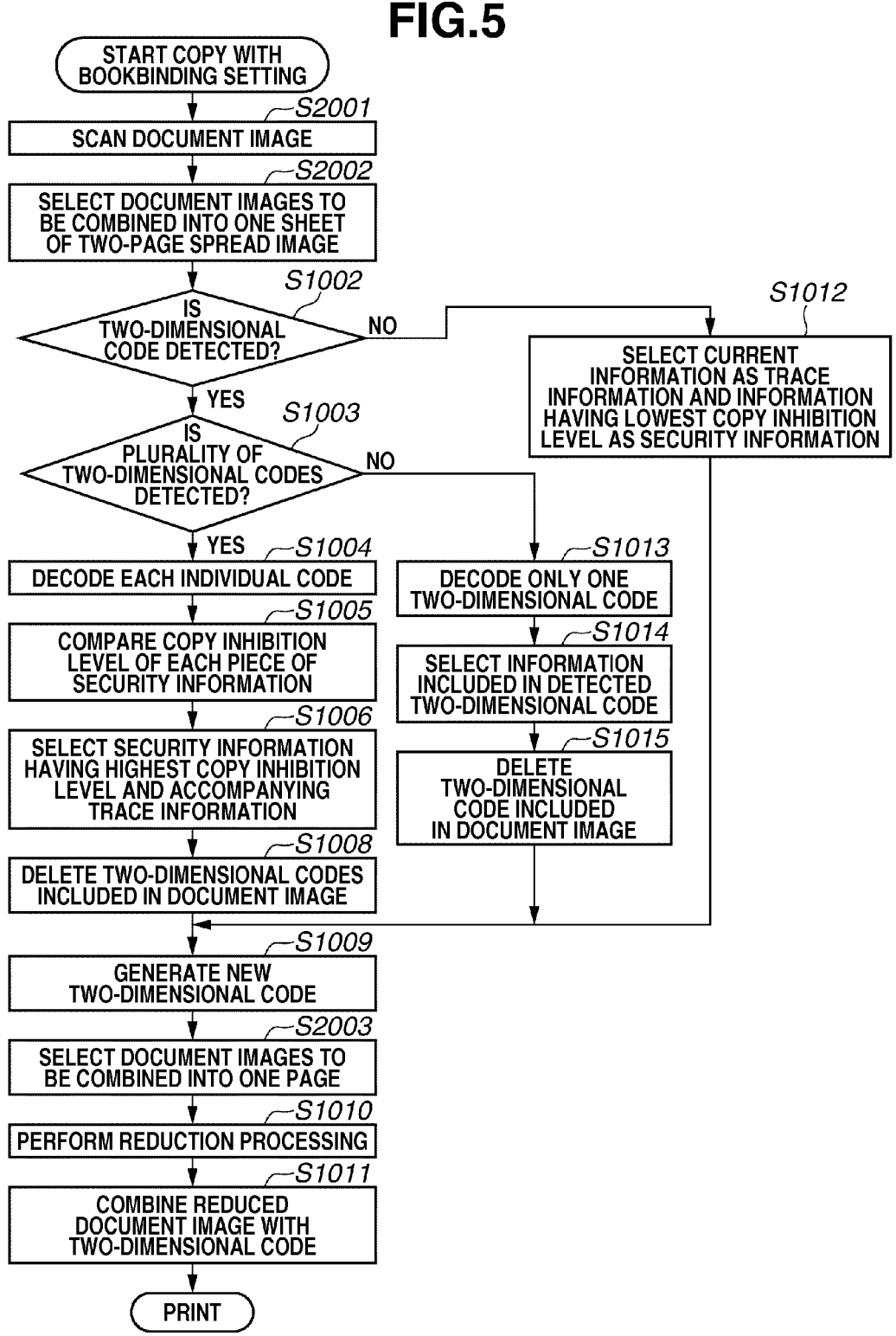
FIG. 5 illustrates a flowchart according to a second exemplary embodiment.

Similar to the flow chart in FIG. 2, processing of each step in the flow chart in FIG. 5 can be executed under total control by the CPU in the MFP 105.

Since processing of steps S1002 to S1015 in FIG. 5 is identical to processing of the corresponding steps in FIG. 2, descriptions will be omitted.

In step S2001, the CPU scans all of the L document sheets on the document positioning plate using a scanner, and generates document images as electric signals. Then, the CPU stores them in a storage device (not illustrated) in the MFP 105. In step S2002, the CPU selects two document images for forming a two-page spread output image having the bookbinding setting out of the stored document images, and performs processing of steps S1002 to S1008, S1002 to S1012, and S1002 to S1015 to generate new two-dimensional codes in step S1009.

In step S2003, to form a two-page spread output image with the bookbinding setting, the CPU changes the order of the plurality of document images stored in the storage device, and selects two document images. In steps S1010 and S1011, the CPU reduces the two document images, evenly combines them into one print sheet, and sequentially prints these images on both sides of the print sheet while combining the generated new two-dimensional codes on each side.

For example, suppose a case where eight one-sided document sheets are placed on the document positioning plate and a bookbinding print-output with leftward opening is generated. In this case, there are four combinations of two document images for forming a two-page spread output image: pages 8 and 1, pages 2 and 3, pages 4 and 5, and pages 6 and 7. The CPU generates the above-mentioned new two-dimensional codes for each of these combinations.

The two document sheets that are selected after the order of the plurality of document images are changed are four combinations of two document images to be actually printed on one page by the MFP 105: pages 8 and 1, pages 2 and 7, pages 6 and 3, and pages 4 and 5.

Therefore, the present exemplary embodiment differs from the first exemplary embodiment in that the combination of document images for generating new two-dimensional codes does not coincide with the combination of document images to be actually printed. However, the CPU determines an area for combining a two-dimensional code based on the combination of pages in which a new two-dimensional code is generated, and prints the two-dimensional code according to the determined area.

FIG. 6 illustrates an exemplary bookbinding print-output according to the second exemplary embodiment. Similar to the previous example, suppose a case where eight one-sided document sheets are placed on the document positioning plate and a bookbinding print-output with leftward opening is generated.

Referring to FIG. 6, a bookbinding output 114 is a two-page spread output image with leftward opening. Suppose that the illustrated pages are a combination of pages 6 and 7, and further new two-dimensional codes 115*a* and 115*b* are combined therewith.

In this case, there are two combinations of document images for actually printing pages 6 and 7: pages 2 and 7, and pages 6 and 3. Although pages 6 and 7 are printed on different sheets, the above-mentioned two-page spread print-output is formed as a result of bookbinding.

Meanwhile, unlike the print-output 114, a print-output 116 is combined only with the two-dimensional code 115a but not with the two-dimensional code 115b. In view of the purpose of combining two-dimensional codes, as mentioned in the first exemplary embodiment, the above-mentioned processing is based on an assumption that combining the two-dimensional code 107b is necessary only when it includes the information about the inhibition to copy.

Further, even when the two-dimensional codes 107a and 107b include the information about the inhibition to copy, the two-dimensional code of either the document image 101 or 102 may include the information about the inhibition to copy. Also in this case, as mentioned in the first exemplary embodiment, the two-dimensional code 107b can be omitted.

Although there is a plurality of combinations of areas for actually combining a two-dimensional code in the bookbinding outputs 114 and 116 illustrated in FIG. 6, descriptions will be omitted since these combinations are similar to those in the first exemplary embodiment.

Figure 7:
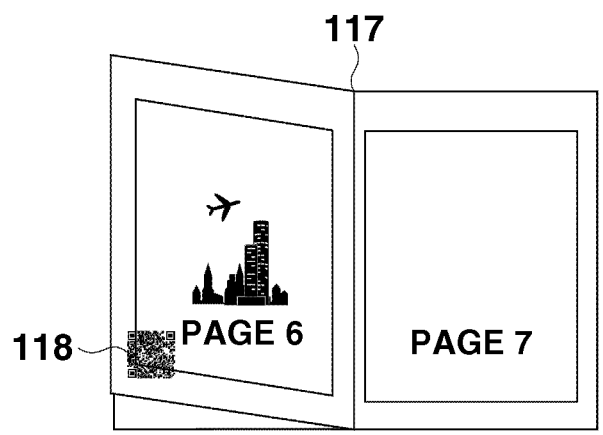
FIG. 7 illustrates an exemplary bookbinding print-output of a blank image according to the second exemplary embodiment.

FIG. 7 illustrates an exemplary bookbinding print-output including a blank image according to the second exemplary embodiment. Suppose a case where six one-sided document sheets are placed on the document positioning plate and a bookbinding output 117 with leftward opening is generated. The bookbinding output 119 is also one of the examples of output page.

In this case, there are four combinations of two document images for forming a two-page spread output image: pages 8 and 1, pages 2 and 3, pages 4 and 5, and pages 6 and 7. With this page configuration, output images on pages 7 and 8 are found to be blank images when the number of document sheets is found to be six.

Referring to FIG. 7, the bookbinding output 117 illustrates a two-page spread output image of pages 6 and 7. The reduced image on either of these pages is a blank image. In this case, in view of the purpose of combining two-dimensional codes, it goes without saying that a two-dimensional code is not necessary for the blank image on page 7. It is necessary to combine a two-dimensional code 118 in a predetermined area of the document image only on page 6.

Figure 8:
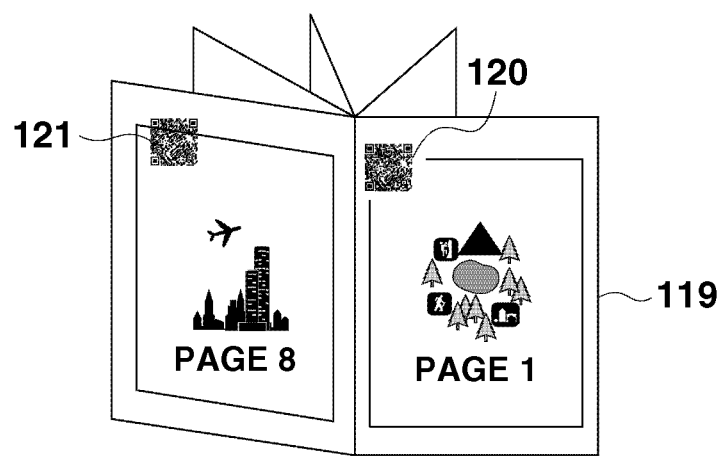
FIG. 8 illustrates an exemplary bookbinding print-output of a cover page according to the second exemplary embodiment.

FIG. 8 illustrates an exemplary bookbinding print-output with cover pages according to the second exemplary embodiment. For example, suppose a case where eight one-sided document sheets are placed on the document positioning plate and a bookbinding output 119 with leftward opening is generated.

In this case, there are four combinations of two document images for forming a two-page spread output image (pages on both side): pages 8 and 1, pages 2 and 3, pages 4 and 5, and pages 6 and 7.

With this page configuration, images on pages 8 and 1 are reduced and evenly combined into one print sheet to form cover pages. FIG. 8 illustrates a two-page spread output image forming a back cover page (page 8) and a front cover page (page 1).

When reduced images forming a two-page spread output image forms cover pages, processing of steps S1013 to S1015 generates new two-dimensional codes. Specifically, the processing generates a new two-dimensional code based on the independent information about the two-dimensional code originally combined on the front or back cover page, and combines the generated code on the front or back cover page.

When the two-dimensional code of one reduced image includes the information about the inhibition to copy, a two-dimensional code 121 is combined in a predetermined area for the one reduced image including the information about the inhibition to copy, and a two-dimensional code 120 is combined in a non-predetermined area for the other reduced image.

The above-mentioned processing is based on an assumption that, when the user copies the cover pages of the bookbinding print-output 119, the user gives higher priority to closing the bookbinding print-output 119 and separately copying pages 1 and 8 than to copying the entire two-page spread output image (pages 1 and 8).

Therefore, a two-dimensional code is generated based on independent information about the two-dimensional code originally combined on the cover pages, and combined on each cover page. When the two-dimensional code of one reduced image includes the information about the inhibition to copy, the two-dimensional code 121 is combined in a predetermined area in the one reduced image including the information about the inhibition to copy, and the two-dimensional code 120 is combined in a non-predetermined area, thus obtaining the following effect.

Specifically, when the user separately copies the cover pages in the closed state or when the user copies the entire two-page spread, the two-dimensional code 121 including the information about the inhibition to copy can be detected.

The embodiments are achieved also by performing the following processing. Specifically, software (program) implementing the functions of the above-mentioned exemplary embodiments is supplied to the system or apparatus through a network or various storage media, and a computer (or CPU or micro processing unit (MPU)) in the system or apparatus loads and executes the program. Each apparatus may be implemented within, include, or otherwise be connected to a central processing unit (CPU), where the CPU is connected to a memory and executes a variety of functions by executing a variety of application programs that are stored in the memory, such as a read only memory (ROM). The ROM may store such information as an operating system, various applications, a control program, and data. The operating system may be the software that controls the allocation and usage of hardware resources such as memory, central processing unit, disk space, and peripheral devices. A random access memory (RAM) may temporarily store the program or the data that is loaded from the ROM. The RAM also is used as a space wherein the CPU executes the variety of programs. In an example, a computer-readable medium or a computer-readable storage medium may store a program that causes an apparatus to perform a method described herein. In another example, a central processing unit may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-003626 filed Jan. 12, 2010, which is hereby incorporated by reference herein in its entirety.

What is claimed is:

1. An apparatus, comprising:
a selecting unit configured to select either information included in a machine readable code which has been included in a first page or information included in a machine readable code which has been included in a second page in a case that the information included in the machine readable code which has been included in the first page and the information included in the machine readable code which has been included in the second page are different; and an outputting unit configured to output a first machine readable code including the selected information on the first page, and a second machine readable code including the selected information on the second page;

wherein a first one of the first page and the second page is outputted on a right side of a print-output and a second one, other than the first one, of the first and the second page is outputted on a left side of the print-output.

2. The apparatus according to claim 1, wherein the outputting unit outputs the first page including the first machine readable code on a first corner and the second page including the second machine readable code on a second corner, and one of the first corner and the second corner is abutting a boundary between the first page and the second page and the other is not abutting the boundary.

3. The apparatus according to claim 1, wherein the selecting unit selects information having a highest security level out of information included in the machine readable codes which have been printed on the first and second pages.

4. The apparatus according to claim 1, wherein both of the outputted machine readable codes include tracking information included in the machine readable code having a selected highest security level.

5. The apparatus according to claim 1, wherein the selecting unit further selects earliest tracking information from tracking information respectively included in the printed machine readable codes in a case that the printed machine readable codes have the same security level.

6. The apparatus according to claim 1, wherein the first machine readable code is identical to the second machine readable code.

7. The apparatus according to claim 1, wherein the first page and the second page are output as a two-page spread.

8. The apparatus according to claim 1, wherein the first page and the second page are output as two sequential pages.

9. A method comprising:

selecting either information included in a machine readable codes which was included in a first page or information included in a machine readable code which has been included in a second page in a case that the information included in the machine readable code which has been included in the first page and the information included in the machine readable code which has been included in the second page are different; and outputting a first machine readable code including the selected information on the first page, and a second machine readable code including the selected information on the second page;

wherein a first one of the first page and the second page is outputted on a right side of a print-output and a second one then the first one of the first and the second page is outputted on a left side of the print-output.

10. A non-transitory computer-readable storage medium storing a program that causes an apparatus to perform a method according to the claim 9.

* * * * *